SENSING INSTRUCTION APPARATUS FOR DATA PROCESSING MACHINE

Filed Feb. 5, 1958

Inventors
JAMES R. WOOD
ARTHUR W. HEINECK JR.
By Edgar H. Kent
Atty.

3,064,895
Patented Nov. 20, 1962

3,064,895
SENSING INSTRUCTION APPARATUS FOR DATA PROCESSING MACHINE

Arthur W. Heineck, Jr., and James R. Wood, Poughkeepsie, N.Y., assignors to International Business Machines Corporation, New York, N.Y., a corporation of New York Filed Feb. 5, 1958, Ser. No. 713,378
13 Claims. (Cl. 235—157)

Figure 1:
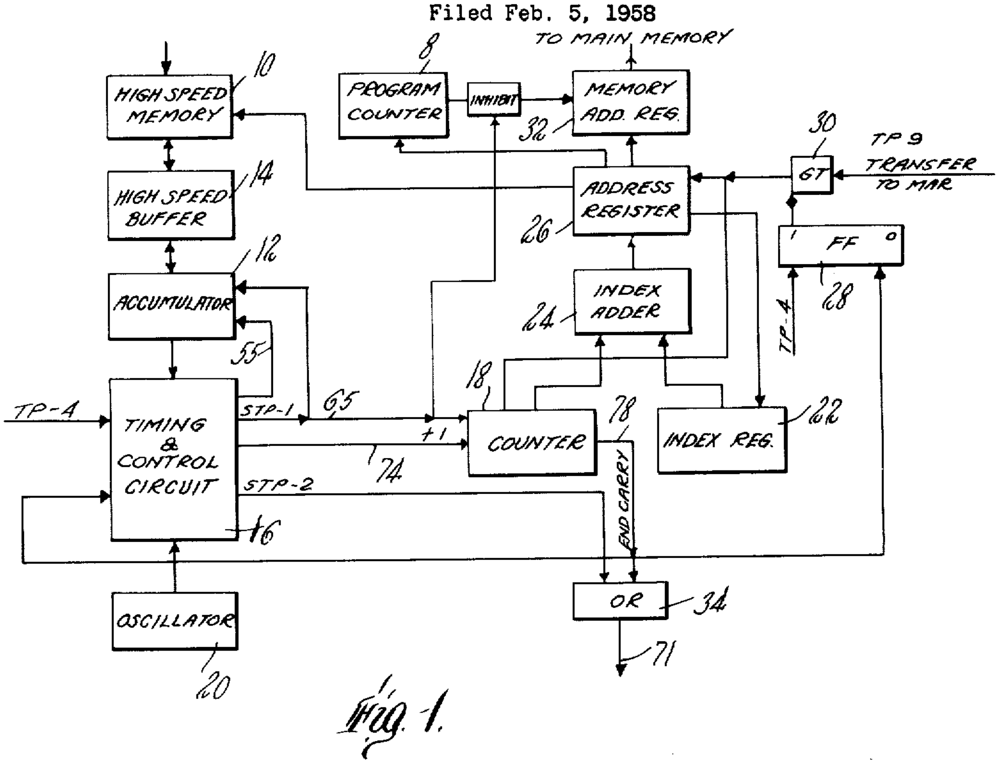

This invention relates to data processing machines in general and more particularly it relates to digital computers which are controlled by means of a stored program.

In data processing equipment which utilizes a stored program the technique of the subprogram or subroutine provides a means for handling frequently repeated program steps in a convenient manner and with a minimum amount of storage space. An instruction, commonly termed the branch or jump instruction, is utilized to initiate the subprogram. Often the execution of the branch instruction is conditional on the existence of certain criteria—that is, if the condition or conditions exist the computer program will branch to the appropriate or designated subprogram and if the condition does not exist the computer will continue along in its main program.

Frequently, a computer is programmed so that it is required to examine a plurality of control items, often individual bits, in a consecutive manner to determine whether certain branch programs should be executed. In a parallel type machine, i.e. one which is adapted to process entire words of multiple bits as units, each item to be examined must be handled as a full word. When a large number of such items are to be processed, each item must be extracted and handled as a full word for either arithmetic or logical operations.

A typical program for the sensing of an individual bit to determine whether a condition is satisfied, as used in a high speed digital computer adapted for parallel operation, is:

| | | |
|---|---|---|
| 001 | CAD (Clear and add) | Two memory cycles |
| 002 | ETR (Extract) | Two memory cycles |
| 003 | BFZ (Branch on zero) | Two memory cycles |
| 004 | BPX (Branch and index) | One memory cycle |

Thus, a total of six memory cycles are consumed if the prescribed condition is not met and a total of seven memory cycles are required for the initiation of a branch operation. This program must be repeated for each item to be examined. An examination of a forty-two bit word (as used in the machine for which the preferred embodiment of the invention was designed) which consists of single bit control items would require a minimum of two hundred fifty-two memory cycles. Therefore, it is most desirable to provide a means to handle such an operation in a more expeditious manner.

Accordingly, it is an object of this invention to provide means for substantially reducing the period required for the examination of a plurality of control items in a parallel type of digital computer to determine whether certain criteria exist.

Another and more particular object of the invention is to provide a serial sensing mechanism suitable for use in a parallel type of digital computer for the sensing of single bit conditional branch items. Still another object of the invention is to provide means whereby the address of the branch instruction may be rapidly obtained.

The invention provides means whereby a plurality of control items in a single word may be serially examined at a rapid rate. Where the prescribed condition is met the subprogram is initiated directly and after the completion of each subprogram the sensing of the control items is continued. Upon completion of this serial sensing operation the main program is resumed. With the preferred embodiment of the invention the maximum machine time required for this operation is less than one quarter that of the comparable machines of the prior art.

Figure 2:
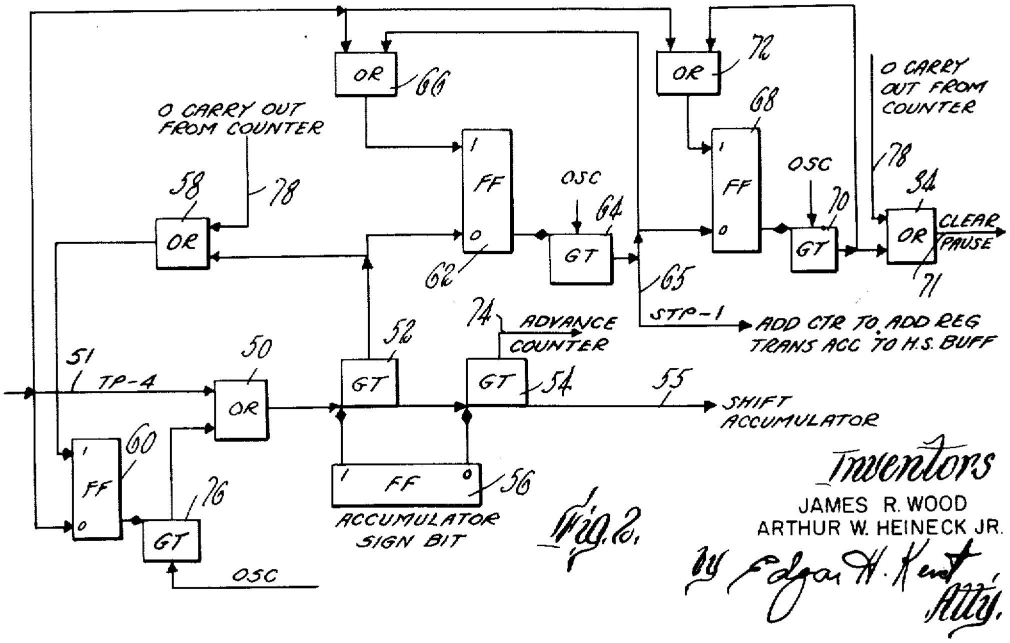

Other objects and advantages of the invention will be readily apparent from the following description of the preferred embodiment of the invention in conjunction with the drawings, in which:

FIG. 1 is a block diagram of digital computer circuitry incorporating apparatus according to the present invention; and FIG. 2 is a logical diagram in block form of the control circuitry associated with the present invention.

In the drawing, a conventional filled-in arrowhead is employed on lines to indicate a circuit connection, energization with pulses and the direction of pulse travel, which is also the direction of control. A diamond-shaped arrowhead indicates a circuit connection and energization with a D.C. level. Bold face character symbols appearing within a block symbol identify the common name for the circuit represented, that is, FF identifies a flip-flop, GT a gate circuit, OR a logical OR circuit, and so forth.

The circuitry of the present invention may be utilized to advantage in electronic data processing machines of the type described and shown in United States Patent No. 2,914,248, entitled "Program Control for a Data Processing Machine". The machine shown in said application is of the stored program, parallel operation type equipped for what is known as Branch and Index operation, and a machine of this type, modified for operation in accordance with the principles of the present invention, constitutes a preferred embodiment of the invention. In the drawing, only so much of the modified machine is shown as is particularly concerned in the present invention. The components are shown only in block diagram since they are known in the art and suitable forms thereof as well as their operating circuitry are shown and described in detail in the aforesaid application or in other disclosures to which it refers, to which reference may be had. For the same reason, only certain of the operating connections to many of the components are illustrated.

In a machine of the type referred to, operations are controlled by a program of a series of instructions which are stored in Main Memory from which they are read out in predetermined order, normally by signals applied to the Memory Address Register by a Program Counter. Usually, the program is arranged for repetitive cycle or loop performance, in the same order, of a series of instructions contained in successive addresses of one or more arrays of the Main Memory. To accomplish this repetitive program, a binary one may be added to the Program Counter before it applies its signals to the Memory Address Register for the next instruction. The Program Counter is therefore a storage register equipped with means for adding a binary number, such as one, to its contents, and for reading its contents.

In order to provide flexibility to the program, certain instructions of the series may be branch or jump instructions which may require the machine to branch to some other instruction and perform the operation called for by that other instruction before returning to the next instruction of the series. Often such a branch instruction may be branch or not branch according to its sign. In the machine of the aforesaid application, provision is made for modifying when desired the address portion of the branch instruction, an operation referred to as "indexing" or "Index Add."

Each instruction is a word made up of a predetermined number of bits according to the capacity for which the machine is designed. In the machine described in the aforesaid application, this number is thirty-two but may be readily modified for a larger number and herein will be assumed as modified for handling 42 bit instructions. These instructions may conveniently be processed as a left-half word and a right-half word, one-half containing the operation information and the other containing the address of the operand on which that operation is to be performed. The address portion of the instruction is passed through a Memory Buffer to an Address Register.

The Address Register is equipped to perform certain operations according to commands received on its control lines. These operations may include, as in the machine of the aforesaid application: (1) store information received; (2) transmit part of contents to a designated Memory Address Register to call out the operand from the designated Memory Address; (3) transmit part of contents to the Program Counter to replace the number therein; (4) clear. Operation (3) may be used to compel the program counter to call out an instruction out of order at the address designated in a branch instruction. However, the same result may be accomplished by transferring the address of the instruction to which the machine is branched from the Address Register to the Memory Address Register and that is done in the embodiment herein illustrated, as will hereinafter appear. The Address Register is also equipped with means for adding its contents to the contents of a selected Index Register to modify the address in the Address Register. Such means is indicated herein by the Index Adder block 24.

The operations portion of an instruction is passed from Main Memory through a Buffer Register to an Operation Register and thence to an Instruction Control Element wherein, as decoded, it controls the distribution of the timing pulses from a Time Pulse Distributor (TPD) which distributes the timing pulses through which the various commands indicated by the instruction are performed. The time pulse cycle may be varied according to design. In the aforesaid application a twelve pulse machine cycle is disclosed, and such a cycle is assumed herein with a ten pulse memory cycle, these cycles made up of two megacycle pulses, making a machine cycle 6 microseconds long and a memory cycle of 5 microseconds.

In carrying out the present invention, a special sensing instruction is provided which is denominated herein the Serial Bit Sense or SBS instruction. Before this instruction is given, however, it will be preceded by the execution of two instructions. One of these instructions causes, in usual manner, the word containing bits to be examined to be selected and delivered from Main Memory to a storage register denominated High Speed Memory and indicated at 10 in FIG. 1; the other causes a binary number, corresponding to the number of bits in the word to be examined, to be delivered to a Counter shown at 18 in FIG. 1. Counter 18 is connected to the Index Adder 24 in the same manner as the Index Register, and is used as a substitute for the Index Register in the operation hereinafter described, wherein its contents are added to the basic branch address in the Address Register. Thereupon the SBS instruction is delivered from Memory under the control of the Program Counter. Its operation portion, processed in the Operation Register and Instruction Control Element, produces the following actions by way of the command generating and distributing equipment.

(1) The address portion of the SBS instruction is delivered to the Address Register, shown at 26 in FIG. 1. This portion includes a group of bits which designate the basic branch address of the Memory unit in which the instructions corresponding to the bits to be examined are located. This group of bits is received in a section of the Address Register which, as more particularly disclosed in the aforesaid application, is connected to deliver its contents to the Memory Address Register shown at 32 in FIG. 1, and is also connected to Index Adder 24 so that its address contents may be modified by an add operation therein. Also, the operation portion of the SBS instruction contains other bits, including tag bits designating the High Speed Memory 10 in which the word to be examined is stored. The information in these tag bits selects the High Speed Memory 10 from which the word to be examined is transferred through a High Speed Buffer 14 to a shift register designated Accumulator 12 in FIG. 1.

(2) The foregoing action may be completed for example by the end of the third time pulse of the machine cycle (TP–3). (A two cycle instruction is assumed and TP numbers herein refer to the second cycle.) The next time pulse, TP–4, activates special circuitry provided by this invention (designated generally Timing and Control Circuit 16 in FIG. 1) and the machine cycle goes into a pause (TP inhibit). Also, TP–4 sets a Flip-flop 28 to a state to condition Gate 30 to pass a pulse to cause Address Register 26 to transfer an address to Memory Address Register 32.

(3) The Timing and Control Circuit under the control of subtiming pulses (STP) from Oscillator 20, senses the bit in the sign bit stage of the Accumulator 12, shifts the contents of the Accumulator to bring the next bit to be examined into the sign bit stage, and steps Counter 18 one. It is assumed herein that the branch condition is one. If the bit sensed is a zero, the sense, shift and step operations are repeated by the STP pulses until a one is encountered or, in the case of all zeros, the last bit is sensed and the machine is returned to its main program.

(4) Whenever the bit sensed is a one in addition to shifting the Accumulator, the STP pulses cause the Counter 18 to deliver signals representing its contents (bit number) to Index Adder 24 which adds them to the basic address in the Address Register to produce a binary number representing the exact address of the branch instruction corresponding to the bit sensed. This address is then transferred to the Address Register 26. Also, the STP pulses cause the shifted contents of Accumulator 12 to be transferred to High Speed Buffer 14 and establishes an inhibit in the Transfer Program Counter to Memory Address Register circuit. This inhibit remains long enough to prevent the transfer before the start of the next memory cycle and then restores. Having initiated this action, the STP pulses clear the pause and decondition the Timing and Control Circuit. The machine cycle is now resumed, at TP–5 assuming the pause was at TP–4, and the operation portion of the SBS instruction is completed causing, by appropriate commands, the shifted word in High Speed Buffer 14 to be transferred back to High Speed Memory 10, and the contents of the Address Register 26 to be delivered to the Memory Address Register 32 by a time pulse at the end of the cycle, thereby selecting the designated instruction to which the machine is branched, for processing in the usual manner during the next machine cycle. Also, the Counter 18 is stepped by this pulse so that it corresponds with the number of bits remaining to be sensed.

When the designated instruction has been executed, the machine must return to the SBS instruction until all the bits according to the number set in Counter 18 have been examined. This is accomplished by including in each subroutine to which the machine is branched under the sub-instruction a command to restore to the Program Counter the address of the SBS instruction. Since the inhibit on Transfer Program Counter to Memory Address Register has been cleared, the SBS instruction will be called out by the Program Counter to Memory Address Register circuit at the conclusion of the subroutine of the instruction to which the machine was branched. Thus the SBS instruction will be processed again and the foregoing steps will be repeated, the only differences being that the word under examination is now returned to the Accumulator in the shifted condition which followed the last previous bit sense, and the contents of the Counter corresponds to the number of bits remaining to be sensed.

(5) When the last bit is sensed, provision must be made for returning the machine to its main program. To this end, the Counter 18 is equipped to provide an end carry or carry zero output which is employed if the last bit sensed is a zero to (*a*) deactivate the Timing and Control Circuit; (*b*) inhibit Transfer Address Register to Memory Address Register by turning off Flip-flop 28, deconditioning Gate 30; and (*c*) clear the pause. The machine now completes its cycle of the SBS instruction, including Transfer Program Counter to Memory Address Register, to continue the regular program, since during the instruction one will have been added to the Program Counter to designate the next instruction.

If the last bit sensed is a one, the final stepping of Counter 18 will not occur until the same TP–9 pulse which causes transfer from Address Register 26 to Memory Address Register 30 so this transfer will not be inhibited by the carry pulse from the Counter. Consequently, the machine will branch to the instruction corresponding to the last bit sensed and perform that subroutine. This subroutine will include a last instruction to set the Program Counter to the next instruction of the main program in order to continue the program if it is desired to make the last bit sensed a one rather than a zero.

The Timing and Control Circuit 16 indicated by block diagram in FIG. 1 is shown in more detail in FIG. 2. Referring to said figure it will be seen that the TP–4 pulse (which in the foregoing description is the pulse which conditions this circuit) is applied to a line 51 by way of which it sets a Flip-flop 60 to the conducting state (zero) and Flip-flops 62 and 68 to the non-conducting state through OR circuits 66 and 72 respectively. Gate 76 is thereby conditioned by Flip-flop 60 to pass the next pulse (STP) from Oscillator 20, whereas Gates 64 and 70 are deconditioned to inhibit passage of such pulse. TP–4 is also applied through OR circuit 50 to sense the condition of Flip-flop 56 constituting the sign bit stage of Accumulator 12 by conditioning Gate 52 to pass the output from the one side of said Flip-flop if it is in the one state and alternatively conditioning Gate 54 to pass the output from the zero side of said Flip-flop if it is in the zero state. From the conditioning inputs of Gates 52 and 54, TP–4 continues via line 55 to shift the Accumulator one stage, to bring the next bit into the sign stage.

If the first Accumulator sign bit is in the zero state, the TP–4 pulse passed by Gate 54 is connected by line 74 to step Counter 18. A pulse from Oscillator 20 is now passed by Gate 76 through OR circuit 50 to sense the condition of the next bit in the Accumulator sign bit stage, Flip-flop 56, and continued on line 55 to shift Accumulator 12. If the bit sensed was again a zero, Gate 54 will pass the oscillator pulse to advance Counter 18 by line 74, and successive oscillator pulses will continue to shift the Accumulator and step the Counter until a one bit is sensed or the last bit has been sensed.

If the first Accumulator sign bit is a one, the output from Flip-flop 56 is passed by Gate 52 through an OR circuit 58 to turn off Flip-flop 60, deconditioning Gate 76 so that no sensing pulse will be received from Oscillator 20. The pulse from Gate 52 is also applied to the zero side of Flip-flop 62, turning it on to condition Gate 64 to pass the next Oscillator pulse. The next Oscillator pulse (designated as STP–1 in the drawing) is passed by Gate 64 and connected back through OR circuit 66 to turn off Flip-flop 62 and decondition Gate 64. By appropriate connections, this Oscillator pulse also initiates the following machine action: (*a*) Add Counter to Address Register; (*b*) Transfer Accumulator to High Speed Buffer; (*c*) Inhibit Transfer Program Counter to Memory Address Register. Further, STP–1 sets Flip-flop 68 in the ON state conditioning Gate 70 to pass the next Oscillator pulse (STP–2) to Clear Pause line 71 through OR circuit 34 and through OR circuit 72, to turn off Flip-flop 68 The machine now resumes its cycle to complete the branch operation and step Counter 18.

It will be noted that by line 78 labeled "0 Carry Out From counter," a Carry produced by the stepping of Counter 18 after the last bit has been sensed is applied through Gate 58 to turn off Flip-flop 60, thereby deconditioning the sensing circuit from Oscillator 20. This will be effective only when the last bit sensed was a zero, since if the last bit was a one, this circuit has been deconditioned before the Counter is given its final step. The carry pulse is also applied through OR circuit 34 to clear the pause, again if the last bit was a zero, since the pause will have been cleared if the bit was a one. Finally, the carry pulse sets the inhibit in Transfer Address Register to Memory Address Register, constituted by Flip-flop 28 and Gate 30 in FIG. 1. While this pulse will be effective whether the last bit is a one or a zero, if the bit was a one the inhibit will not become effective until after this transfer, corresponding to the sensed one bit, has taken place.

Counter 18 should be so designed as in effect to count down from a number set therein to zero. Counters of this type which are suitable for performing the functions assigned to Counter 18 herein are well known. For example, the Counter may be similar to the program counter disclosed in the aforesaid application Serial Number 570,199 except that the output lines from the Counter Flip-flops to the Index Adder will be connected to the non-corresponding inputs of the Index Adder so that the Counter contents are applied in complement form. The Counter will then be set with the number of bits to be examined in ones-complement form and will be cleared to the one state by completion of the count, to operate in effect as a subtracter, with its complemented contents at any time representing the actual count.

The Oscillator 20 may be of conventional construction and is assumed herein to produce two megacycle pulses such as are used in the TPD system. More detailed description than that heretofore given of the components of the exemplary machine and added circuitry of the invention is deemed unnecessary, as suitable forms thereof will be apaprent to those skilled in the art and are disclosed in the above-referenced application.

It will be understood that while the invention has been particularly described herein as applied to the machine disclosed in the aforesaid application, this is merely for the sake of illustration and that the invention may be advantageously employed in other machine types and constructions. Also, it will be understood that the special circuitry herein disclosed may be altered or adapted as desired to suit various other machines, programs, timing arrangements, etc. For example, the sensing circuitry may be revised for serial sensing of multibit groups or items. A counter may be added to count the branches made in examining a word if such a count is desired. Facilities may be included for branching on both ones and zeros, and so on.

Therefore, while there has been shown and described herein a preferred embodiment, the invention is not intended to be limited thereby or to all details thereof, and departures may be made therefrom within the spirit and scope of the invention as set forth in the appended claims.

We claim:

1. In a stored program type of digital computer, the combination comprising means to store words containing a plurality of information bits, said words including words representing main program instructions, words representing subprogram instructions, words representing operands and at least one subprogram control word having a plurality of items, each said item controlling the initiation of a related subprogram instruction, means for processing said information and operand words in accordance with said instruction words, sensing means for serially sensing items consisting of different bits of said subprogram control word, said processing means initiating operation of said sensing means in response to an instruction word, counter means, means for stepping said counter means as each item is sensed by said sensing means, subprogram instruction selecting means, and means responsive to the detection of an item having a predetermined condition as indicated by said sensing means to de-activate said sensing means and to apply the contents of said counter means to said subprogram instruction selecting means to cause said computer to process the subprogram instruction indicated by the applied contents of said counter means.

2. The combination as claimed in claim 1 wherein said items are single bits.

3. The combination as claimed in claim 1 wherein said sensing means comprises a shift register including a sign stage at one end thereof, means to supply to said register the word to be serially sensed, pulse supply means connected to the sign stage of said register to sense the condition of said stage, and means for shifting the contents of said register in the direction of the sign stage after each sense pulse.

4. The combination as claimed in claim 1 which includes means to automatically reactivate said sensing means upon completion of each instruction processing operation initiated in response to the application of the contents of said counter to said subprogram instruction selecting means to examine the condition of the next item to be sensed of said control word.

5. The combination as claimed in claim 1 wherein said processing means is arranged to interrupt its normal operating cycle during the operation of said sensing means and said sensing means includes means to resume its normal operating cycle upon sensing of said predetermined condition.

6. The combination as claimed in claim 1 wherein said processing means is arranged to interrupt its normal operating cycle during the operation of said sensing means and said sensing means includes means to resume its normal operating cycle upon sensing of the last item of said control word.

7. In a stored program type of digital computer, the combination comprising means to store words containing a plurality of information bits.

said words including words representing main program instructions, words representing subprogram instructions, words representing operands, and at least one subprogram control word having a plurality of items, each said item controlling the initiation of a related subprogram instruction, means for processing said information and operand words in parallel manner in accordance with said instruction words, sensing means for serially sensing items consisting of different bits of said control word, said processing means initiating operation of said sensing means in response to an instruction word, a counter, means operative prior to the initiation of operation of said sensing means to set said counter as a function of the number of items to be sensed, means for stepping said counter as a function of each item sensing operation by said sensing means, subprogram instruction selecting means, means responsive to the sensing of an item having a predetermined value by said sensing means to deactivate said sensing means and to apply the contents of said counter to said subprogram instruction selecting means, said application of the contents of said counter to said subprogram selecting means causing said processing means to process the subprogram instruction related to the location in said subprogram control word of the sensed item having said predetermined value.

8. The combination as claimed in claim 7 wherein said selecting means includes means for adding a number representing the basic branch address of said subprogram instructions to the contents of said counter.

9. In a stored program type of digital computer adapted for parallel operation, the combination comprising means to store words containing a plurality of information bits, said words including words representing main program instructions, words representing subprogram instructions, words representing operands and at least one subprogram word having a plurality of items, each said item controlling the initiation of a related subprogram instruction, means for processing said information and operand words in parallel manner in accordance with said instruction words, sensing means for serially sensing items of said subprogram control word including a shift register having a sign stage at one end thereof, means to supply to said shift register said subprogram control word, pulse supply means connected to the sign stage of said register to sense the condition of said sign stage and to cause a shift of the contents of said register in the direction of said sign stage after each sensing operation, said processing means initiating operation of said sensing means in response to an instruction word, a counter arranged to be stepped in response to a pulse from said pulse supply means after each sensing operation, subprogram instruction selecting means, and means responsive to the sensing by said sensing means of an item having a predetermined value to deactivate said sensing means and to apply the contents of said counter to said subprogram instruction selecting means, the application of the contents of said counter to said subprogram selecting means causing said processing means to process the related subprogram instruction as a function of the transferred contents of said counter.

10. The combination as claimed in claim 9 which includes means activated by said pulse supply means upon sensing of said predetermined condition to add the contents of said counter to a number representing the basic branch address in said storage means of said subprogram instructions before said counter is stepped.

11. In a digital computer system operative in response to a stored program of instructions, memory means for storing information words, operand words and instruction words, control means for controlling the processing of said information words and said operand words in accordance with said instruction words in parallel manner, at least one of said operand words including a plurality of control items, sensing means responsive to a single instruction word for serially sensing said plurality of control items in said one operand word including means to determine whether each said sensed control item satisfies a specified criterion, and means responsive to the sensing of a control item which satisfies said specified criterion to cause said processing means to process an instruction word as a function of the location of that sensed item in said one operand word.

12. The computer system as claimed in claim 11 wherein each instruction word has an operation portion and an address portion, the address portion of said single instruction word forming a basic branch address, and further including means, operative as a result of the sensing of a control item that satisfies said specified criterion, to add a quantity that is a function of that control item to said basic branch address to produce a modified address, and means to cause the computer system to next process the instruction word stored in said modified address.

13. The computer system as claimed in claim 11 wherein said processing means normally operates in response to regularly generated timing pulses and further including means to inhibit the generation of said timing pulses for the control of said processing means during the interval when said sensing means is sensing individual control items in said one operand word in accordance with said single instruction word.

References Cited in the file of this patent

UNITED STATES PATENTS

| | | |
|---|---|---|
| 2,800,277 | Williams et al. | July 23, 1957 |
| 2,874,901 | Holmes | Feb. 24, 1959 |
| 2,902,675 | Shaw et al. | Sept. 1, 1959 |